United States Patent [19]

Lay

[11] Patent Number: 5,141,173

[45] Date of Patent: Aug. 25, 1992

[54] PRESSURE-JET AND DUCTED FAN HYBRID ELECTRIC CAR

[76] Inventor: Joachim E. Lay, East Lansing. Mich.

[21] Appl. No.: 743,753

[22] Filed: Aug. 12, 1991

[51] Int. Cl.⁵ .................... B64C 29/04; B64C 37/00
[52] U.S. Cl. .................... 244/2; 244/23 R; 244/52; 244/23 A; 180/2.2; 180/117; 180/65.3
[58] Field of Search ........... 244/2, 23 R, 23 A, 23 B, 244/58, 53 R, 52; 180/2.2, 116, 117, 65.3

[56] References Cited

U.S. PATENT DOCUMENTS

| | | | |
|---|---|---|---|
| 1,469,264 | 10/1923 | Lubeck | 180/65.3 |
| 2,989,271 | 6/1961 | Bohr | 244/23 A |
| 3,152,776 | 10/1964 | Tresilian et al. | 244/23 R |
| 3,265,330 | 8/1966 | Conway et al. | 244/2 |
| 3,276,528 | 10/1966 | Tucknott et al. | |
| 3,486,718 | 12/1969 | Marchal et al. | |
| 3,494,575 | 2/1970 | Budworth | |
| 3,499,163 | 3/1970 | Verreault | 180/2.2 |
| 3,774,865 | 11/1973 | Pinto | 244/23 C |
| 4,043,421 | 8/1977 | Smith | 180/117 |
| 4,141,425 | 2/1979 | Treat | 180/65.3 |
| 4,171,784 | 10/1979 | Eickmann | |
| 4,218,624 | 8/1980 | Schiavone | 180/65.3 |
| 4,768,738 | 9/1988 | Weinert | 244/58 |
| 4,955,560 | 9/1990 | Nishina et al. | 244/58 |

*Primary Examiner*—Galen Barefoot
*Attorney, Agent, or Firm*—Ian C. McLeod

[57] ABSTRACT

A hybrid electric vehicle (10) capable of ground travel and air travel is described. The vehicle provides for movement over the ground by wheel motors (20) mounted at each of four ground engaging wheels (14 and 16). The wheel motors are supplied with electric power by a battery pack (24) or an electric generator (32) powered by a combustion engine (22). The combustion engine is also geared to vertically oriented ducted fans (40) and a horizontally oriented ducted fan or propeller (76) for providing the vehicle with the capability of travel through the air. Pressure jets (62), supplied with compressed air from a compressor (66) driven by the combustion engine, augment the lift of the ducted fans and provide steering for the vehicle. The vehicle can also be provided with photo-electric cells (82) for supplying a portion of the electric power for the vehicle.

25 Claims, 6 Drawing Sheets

PRESSURE-JET AND DUCTED FAN HYBRID ELECTRIC CAR

BACKGROUND OF THE INVENTION

(1) Field of the Invention

The present invention relates to an all-terrain, hybrid electric vehicle capable of air travel or flight by means of ducted fans, augmented by pressure jets for enhancement and steering. In particular, the present invention relates to a passenger vehicle that is capable of both ground travel and of travel through the air. A hybrid system allows a driver to selectively switch between an electric drive and an electric drive combined with a combustion engine drive for extended ground travel. The electric drive is quiet-running and is preferably used for short range, city type driving. In this mode, the vehicle does not emit by-products of hydrocarbon combustion and is essentially operating pollution free. The electric drive also provides a quiet, noise free drive for the passengers and helps to decrease noise pollution. The combustion engine drive can be a conventionally mounted gasoline engine or it can be a turbo-axle or turbine engine. The combustion engine drive is preferably used for peak performance such as acceleration and fast cruising on highways and for powering a generator of electricity.

In the flying car mode, the invention makes use of a plurality of ducted fans driven directly by the gasoline engine or the turbo-axle engine. For additional lift and fine steering control, small jets, powered by compressed air, are used. The compressed air is contained in a plenum chamber which can be part of the structure of the vehicle, or the air chamber can be stored on board when air travel is anticipated. The compressed air chamber can be recharged with an on-board centrifugal compressor driven directly by the engine or by the electric motor. Also, a thrust fan provides thrust along a longitudinal axis while a retractable rudder provides steering or directional control in flight.

An optional feature incorporates surface silicon-cell arrays in the roof and sides of the vehicle that transforms the vehicle into a solar car. To compensate for the loss of array efficiency imposed by the vehicle's shape, gallium arsenide solar cells may be used, either exclusively, or in conjunction with the silicon solar cells. The solar cells can energize the electric motor directly and also recharge the batteries which power the electric motor.

(2) Prior Art

The prior art has described various types of vehicles capable of both ground travel and of travel through the air. Illustrative of the prior art vehicles are Tucknott et al U.S. Pat. No. 3,276,528; Marchal et al U.S. Pat. No. 3,486,718; Budworth U.S. Pat. No. 3,494,575 and Eickmann U.S. Pat. No. 4,171,784.

Tucknott et al describes a ground travel vehicle with applied differential torque steering. The vehicle is preferably powered by two or more internal combustion engines that are geared to lateral fans and front and rear fans, and to ground engaging wheels. The lateral fans are arranged in rows of three on each of the longitudinal sides of the vehicle while the front and rear fans are arranged in rows of four at the front and the rear of the vehicle. The fans produce a jet that enables the vehicle to hover. Simultaneous driving of the wheels and the fans is used to achieve directional control and/or improved traction over soft ground. Stabilization in the air is effected by controlling the blade angle and/or rotational speed of the ducted fans differentially in both sides for roll, and fore-and-aft for pitch. Control of steering in the air is effected by means of vanes in the jet outlets to deflect the lifting thrust differentially so as to produce a yawing moment. Auxiliary jets may also be used for steering and control in the air. The vehicle also has flywheels that store extra energy to enable the vehicle to leap over obstacles.

Budworth describes a ground and air vehicle that has an arrangement of lift fans driven by a pair of forward gas turbine engines and a pair of aft turbine engines as prime movers for the vehicle. The turbine engines drive compressors that supply compressed air into the plenum chamber provided by the chassis structure of the vehicle. The chassis mounts four road wheels powered by the prime movers for ground travel. Steering the vehicle during ground travel provides no part of the invention. The chassis also provides for eight lifting units each comprised of a pod that houses a downwardly discharging lift fan driven by one of the gas turbines, the gas turbines being supplied with compressed gas from the plenum chamber. The vehicle depends for lift on the reaction of jet momentum downwards from each lift unit providing upward jet propulsion or lift. The vehicle is also provided with operator's control means which are moveable in two dimensions and accordingly control the admission of gas to each lift unit. This provides control in pitch and enables the altitude of the vehicle to be selected so that a component of thrust is useful as horizontal propulsive thrust.

Marchal et al describes a ground effect vehicle also known as an air-cushion vehicle which can be converted to a vertical take-off and landing machine. The vehicle has no wheels for ground travel, but instead relys on cushions of compressed air confined in bell-shaped plenum chambers fed through a manifold by a compressor driven by an engine. The vehicle uses downwardly oriented rockets located at the four corners of the vehicle to "leapfrog" over obstacles. The rocket propulsion is provided by an engine driven air-screw or ducted fans. An engine driven air-screw provides for movement over the ground.

Eickmann describes a combination air and ground traveling vehicle having a lowerable chassis. The vehicle has four road wheels for ground travel and is equipped with a plurality of propellers, each driven by a rotary hydraulic motor of the radial piston type for air travel. The hydraulic motors include dual hydraulic rotors with each rotor being supplied with fluid by a separate hydraulic pump to form a redundant drive system. For air travel, the propellers are mounted in oblique air ducts for shrouds that are pivotable in the direction of travel. The pumps and the motors are mounted on a lowerable and retractable substructure which is lowered below the body for stabilizing flight and retracted into the body when traveling on the ground. Steering is provided by a rudder, elevation or yaw stabilizing means.

In addition to the prior art discussed above, electric cars, gasoline engine cars and flying machines all have their individual histories. Although battery powered, electric cars are not a panacea for the energy and pollution problems plaguing our industralized world, they do provide substantial improvement for the pollution generated by combustion engines. Batteries store the energy generated at a central electrical plant and avoid emitting local pollution, which is critical in large cities. The pollution emitted at the central plant is less per unit of power output than it is for vehicles with combustion engines. In that respect, electric cars buy time to resolve the problem of ever increasing global demand for energy sources in our quest to find alternatives to pollution creating fossil fuels. Also, battery-powered vehicles could get their energy from a non-polluting renewable source such as hydroelectric, solar or wind power, as well as from conventional fossil fuels.

Until recently, any effort to design a battery powered vehicle has been inhibited by the assumption that a gasoline burning alternative can do the job better, even if fuel prices rise substantially. For this reason, a hybrid vehicle that incorporates the advantages of an electric vehicle with a gasoline powered one, thus combining some of the benefits of both systems, is logical. A hybrid vehicle uses electric propulsion for low speed, short range city driving, and gasoline power for rapid acceleration, high speed and long range highway operation. Present hybrids include the Peugeot 205 Supermini TM which has a 72 volt Ni—Cd battery pack powering a 16 horsepower DC motor front train, and the Audi Duo Quattro TM which uses a gasoline front drive and a Ni—Cd battery powered rear train with a 12.8 horsepower electric motor.

However, what is needed is a hybrid electric powered vehicle that is capable of travel through the air. The hybrid electric vehicle of the present invention uses a plurality of ducted fans and flight controlling pressure jets to enable the vehicle to travel through the air. This enables a driver of the hybrid vehicle to reach remote areas that would normally not be accessible by ground travel and to bypass road obstacles, thus decreasing travel time.

OBJECTS

It is therefore an object of the present invention to provide a hybrid electrical-drive ground vehicle that is capable of air travel by means of ducted fans augmented by pressure jets for additional lift and fine steering control of the vehicle. Further, it is an object of the present invention to provide a vehicle having road engaging wheels driven by electric wheel motors powered by a battery pack and a combustion powered engine driving an electric generator wherein the vehicle is also capable of air travel provided by ducted fans, powered by the combustion powered engine and augmented by pressure jets that serve as fine steering control for the vehicle. Further, it is an object of the present invention to provide a hybrid electric ground traveling vehicle that is capable of air travel powered by a plurality of ducted fans, driven by a combustion powered engine, and augmented by compressed air jets which are supplied with compressed air from an on-board compressor driven by the combustion engine, and that provide additional lift and fine steering control to the flight of the vehicle. Finally, it is an object of the present invention to provide a ground traveling hybrid electric vehicle that is capable of traveling through the air by use of a plurality of ducted fans wherein photo-electric cells are mounted on the outside of the vehicle and provide a portion of the electrical power for the hybrid drive of the vehicle. These and other objects will become increasingly apparent by reference to the following descriptions and to the drawings.

GENERAL DESCRIPTION

The present invention relates to a vehicle capable of ground travel and of travel through the air which comprises: a vehicle body with ground engaging wheels journaled on the vehicle body to support the vehicle body for ground travel; a prime mover means mounted on the vehicle body for powering the vehicle for ground travel; propulsion means mounted on the vehicle for moving the vehicle in a horizontal direction in the air; a plurality of ducted fan means powered by the prime mover means and mounted on the vehicle body with nozzle means mounted on each of the ducted fan means for directing an efflux from the ducted fan means to produce a substantially downwardly vertical momentum thrust of a magnitude capable of lifting the vehicle off the ground for travel through the air; a plurality of pressure jet means directing a compressed gas in a substantially downwardly vertical direction, wherein there is at least one jet means adjacent to each of the ground engaging wheels of the vehicle and wherein each of the jet means is capable of being selectively actuated for aiding in controlling the direction of the travel of the vehicle through the air; and supply means for the compressed gas mounted on the vehicle and connected to the jet means; control means for independently activating each of the pressure jet means to provide steering control for the vehicle in the air.

One preferred embodiment of the hybrid electric vehicle of the present invention has wheel motors mounted at each of the ground engaging wheels. The wheel motors are electrically powered by either a battery pack or a combustion engine and generator combination. The wheel motors can also be powered by the battery pack and the combustion engine driven generator in combination.

Another embodiment of the present invention comprises a direct current motor powered by a battery pack and geared to one of the vehicle axles. The electric motor is used for relatively short range, city type driving. A combustion engine is geared to the other axle and is used for long range, high speed travel. The driver has the ability to switch from the electric motor to the combustion engine depending on the traveling condition anticipated.

SPECIFIC DESCRIPTION

FIGS. 1 to 6 show the preferred embodiment of a pressure-jet and ducted fan hybrid electric vehicle 10 of the present invention. As shown in the Figures, the vehicle 10 includes a conventional body structure 12 having a longitudinal axis a—a and generally comprised of spaced apart right and left sides 12a and 12b and a front end 12c and a rear end 12d extending to a top side 12e of the vehicle 10. Front wheels 14 and rear wheels 16 are journaled on axles (not shown) mounted on the body 12. The vehicle 10 is further provided with a passenger compartment having seats 18 (only one shown in FIG. 2), for transporting passengers. The vehicle 10 is steered over the ground by a conventional steering wheel (not shown) connected to the front axle.

Figure 2:
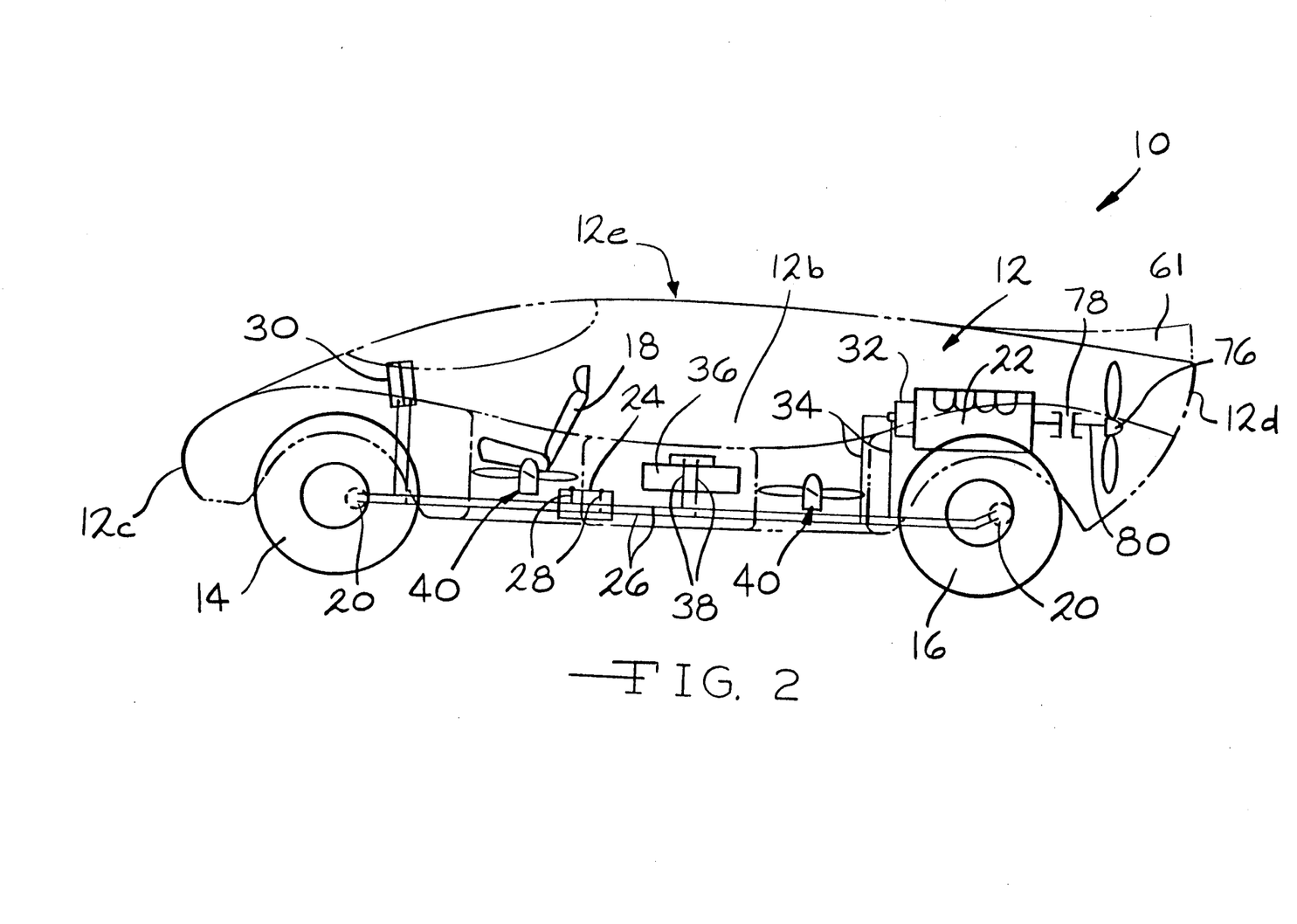
FIG. 2 is a side view of the vehicle 10 of FIG. 1 closer to the longitudinal axis a—a (FIG. 3) of the vehicle 10 shown in FIG. 1 showing a battery pack 24 powering wheel motors 20 for driving ground engaging wheels 14 and 16 and showing the combustion engine 22 driving a generator 32 with a flywheel motor generator 36 and the battery pack 24 connected to a wire bus 26 for the wheel motors 20.
Figure 3:
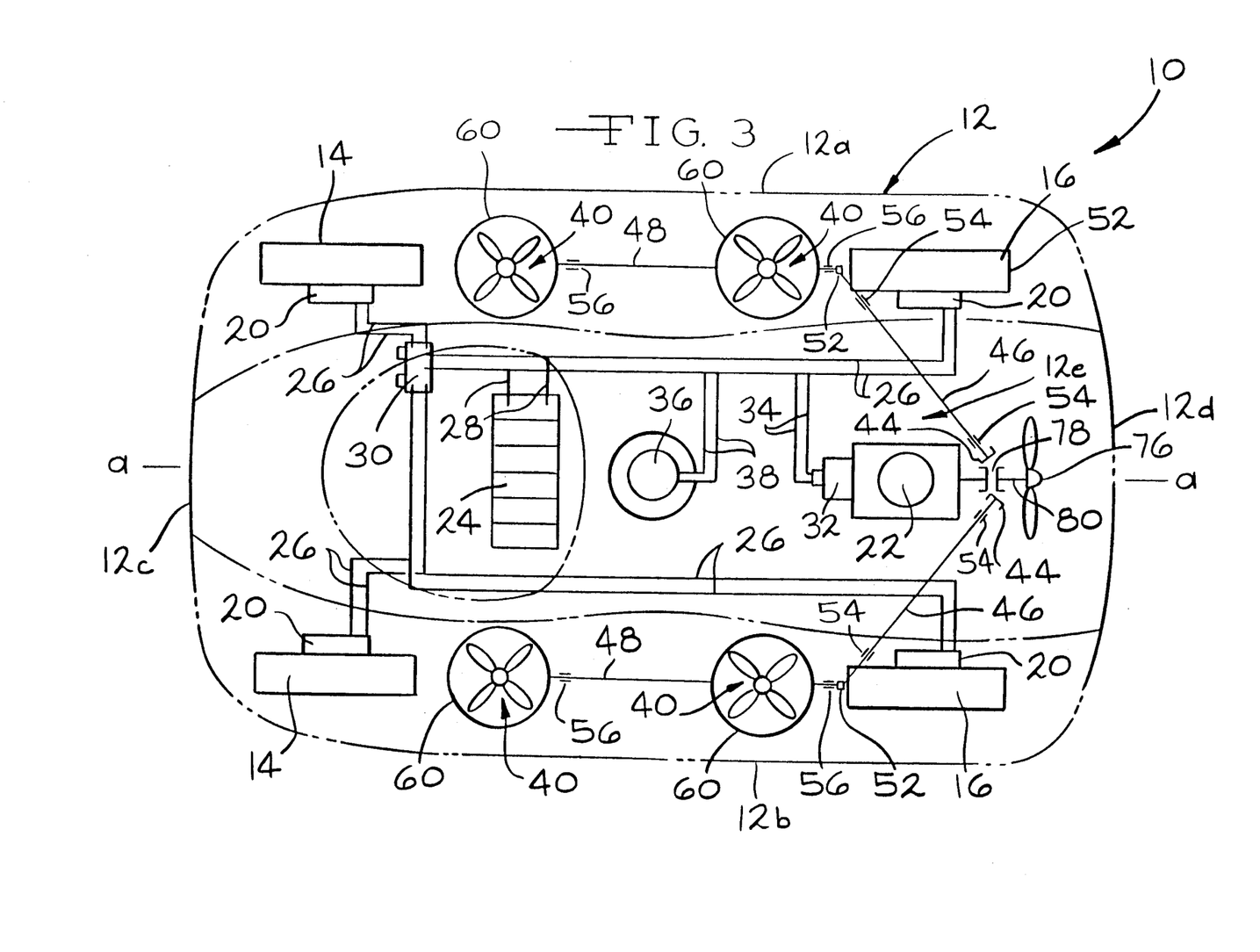
FIG. 3 is a plan view of the vehicle 10 of FIG. 1 showing the coupling of the combustion engine 22 to the ducted fans 40 and the electrical system for connecting the combustion engine 22 and generator 32, the battery pack 24 and the flywheel generator 36, and the wire bus 36 for the wheel motors 20.

The vehicle 10 is powered by four electric wheel motors 20 mounted on the wheels 14 and 16 and a combustion engine 22 that is preferably fueled by gasoline. The wheel motors 20 are lightweight, ultra-thin, direct current motors that are preferably used for pollution free, city driving where the vehicle 10 will likely be driven a relatively short distance. As shown in FIGS. 2 and 3, the primary source of power for the wheel motors 20 is a battery pack 24, preferably a nickel-cadmium battery pack, which is connected to a main power bus 26 for the motors 20 by conduits 28. Although a nickel-cadmium battery pack 24 is preferred, it should be understood that any type of battery is acceptable which will provide the wheel motors 20 with sufficient electricity to power the vehicle 10 and which are readily rechargeable.

Figure 6:
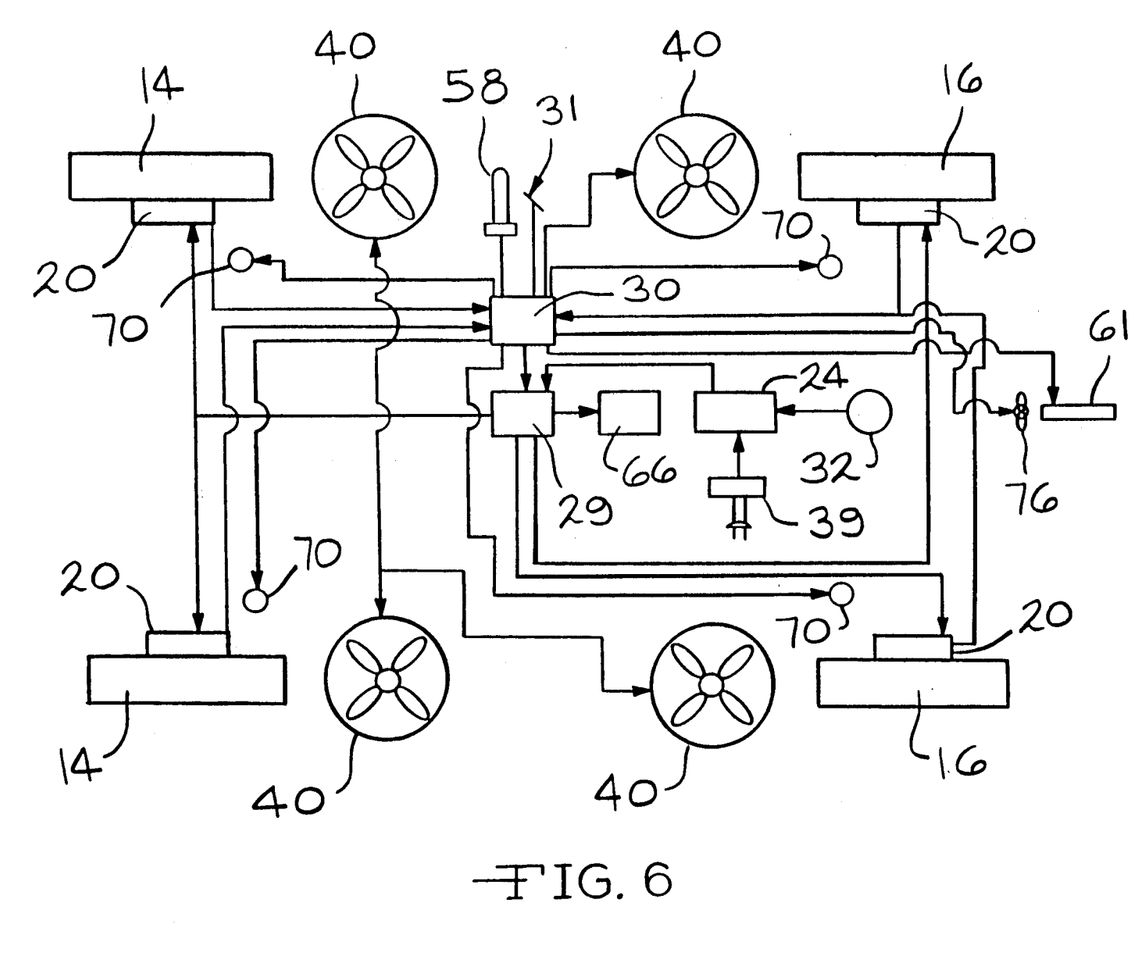
FIG. 6 is a block diagram of the vehicle 10 of FIG. 1 showing the routing of driver control commands from the brake and acceleration pedals 31 and a joystick 58 which are processed by the computer 30 and sent to the wheel motors 20, the ducted fans 40 and 76, and the pressure jet valves 70.

As shown in the block diagram in FIG. 6, the battery pack 24 is connected to a power controller 29 that receives control commands from a logic control computer 30 to regulate the pulsing of the current from the battery pack 24 to the wheel motors 20. The computer 30 processes driver inputs from the brake and accelerator pedals 31 to control the speed of the vehicle 10 by controlling the power controller 29, such as a solid-state thyristor, as is known to those skilled in the art. The power controller 29 pulses current at variable rates to maximize efficiency of current flowing to the wheel motors 20.

Figure 1:
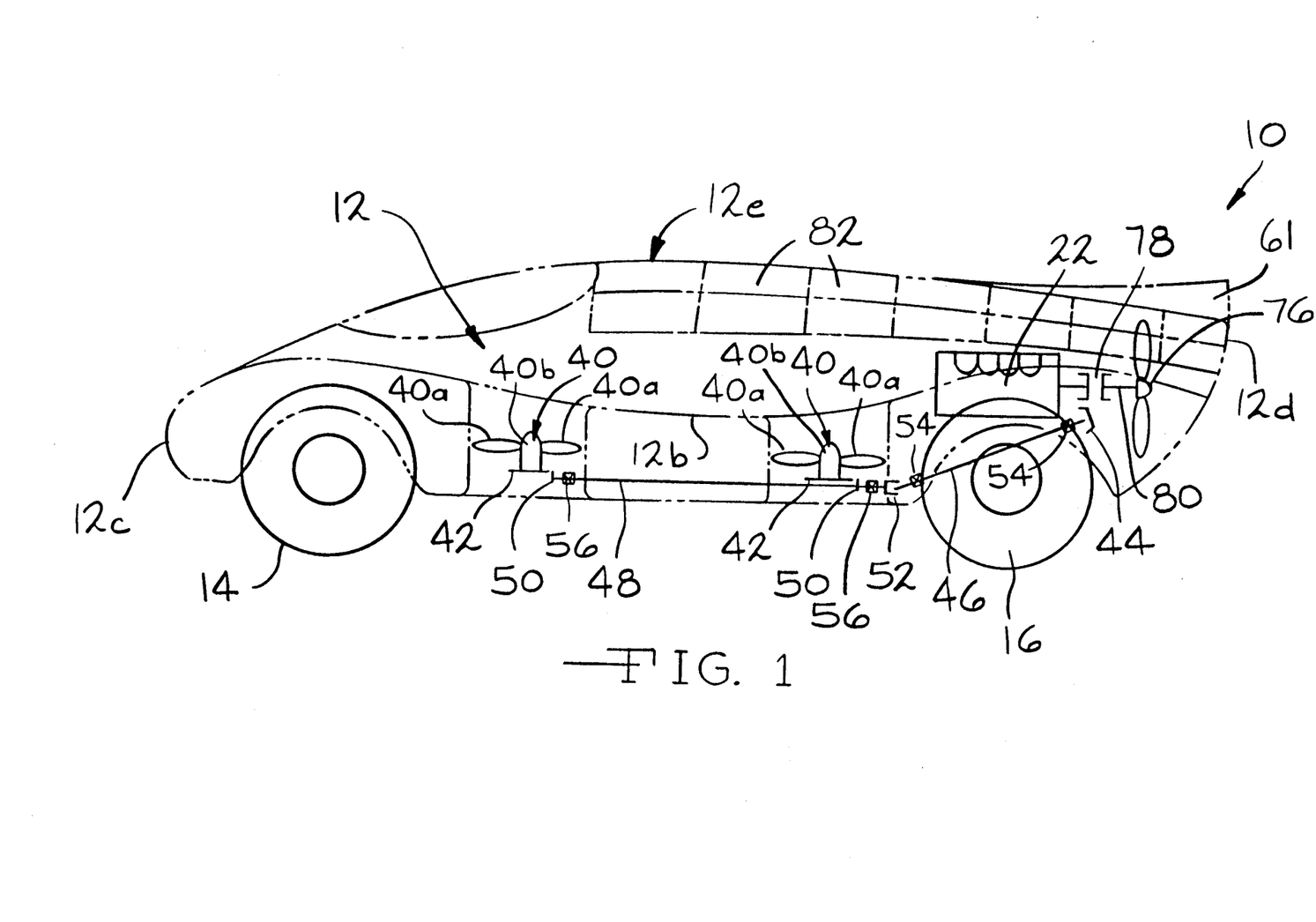
FIG. 1 is a side view of a pressure-jet and ducted fan hybrid electric vehicle 10 spaced from the longitudinal axis a—a of the vehicle 10 (FIG. 3) and showing the coupling of a combustion engine 22 to primary ducted fans 40 and a secondary ducted fan 76 and showing the body of the vehicle in broken lines.

As particularly shown in FIGS. 1 to 3, the combustion engine 22 is preferably mounted adjacent to the rear end 12d of the vehicle 12. The combustion engine 22 is a gasoline engine that is preferably used for peak performance driving such as during acceleration and fast cruising on highways. It is contemplated by the scope of the invention that the combustion engine 22 can be substituted with a rotary turbine engine (not shown), although, the gasoline combustion engine 22 is preferred.

The combustion engine 22 drives a generator 32 mounted to the front of the engine 22. The generator 32 is connected to the main power bus 26 by conduits 34 and provides electricity to the motor wheels 20 to augment the power delivered to the motor wheels 20 by the battery pack 24. The generator 32 also serves to recharge the battery 24. By turning an ignition key (not shown) in a first or a second direction, a driver has the option of switching between an independent mode with only the battery pack 24 driving the electric motors 20 for powering the vehicle 10 and a combination mode with the combustion engine 22 providing supplemental power to charge the battery pack 24, depending on whether the driver anticipates city driving or high speed, highway driving.

A flywheel generator motor 36 comprising a regenerative braking system is connected to the bus 26 by conduits 38. The flywheel 36 conserves some of the momentum energy created when the vehicle 10 is moving. Releasing the accelerator pedal 31 (FIG. 6), instantly engages the flywheel generator motor 36. The flywheel 36 then acts as a generator to recharge the battery pack 24 on braking. The block diagram in FIG. 6 depicts the flywheel as a source charger 39 for charging the battery 24.

As shown in FIGS. 1 to 3, the vehicle 10 uses primary ducted fans 40 mounted adjacent to and behind the front wheels 14 and adjacent to and forward of the rear wheels 16 for travel through the air. The ducted fans 40 are comprised of a plurality of fan blades 40a mounted on a rotating shaft 40b having a drive gear 42 for driving the ducted fans 40. The ducted fans 40 are geared directly to the gasoline engine 22 by a mechanical linkage comprised of a clutch 44, a pair of lateral drive shafts 46, and a pair of secondary drive shafts 48 that mount bevel gears 50 which mesh with the drive gears 42 (FIG. 1) for driving the ducted fans 40. The rotational torque of the lateral drive shafts 46 is transmitted to the secondary drive shafts 48 by a universal joint or coupling 52. Bearings 54 are provided on the lateral drive shafts 46 and bearings 56 are provided on the secondary drive shafts 48. The bearings 54 and 56 help to maintain the shafts 46 and 48 rotating about their respective rotational axes, thereby preventing wobble in the drive shafts 46 and 48. The clutch 44 can be either mechanical or it can be an electrical clutch 44, which is preferred. An electrical clutch 44 is light in weight. This helps to reduce the overall weight of the vehicle 10 and is an important consideration for any vehicle that provides for travel through the air.

As shown in FIGS. 1 and 3, the secondary drive shafts 46 extend along the right and left sides 12a and 12b of the vehicle 10. The secondary drive shafts 46 provide for mounting the bevel gears 50 which mesh with the drive gear 42 for driving the ducted fans 40 (only the bevel gears 50 and the drive gears 42 for driving the ducted fans 40 along the left side 12b of the vehicle 10 is shown). Bearings 56 are spaced along the extent of the secondary drive shafts 48 and prevent wobble in the drive shafts 48 as they rotate.

As shown in FIG. 3, the ducted fans 40 are mounted in pods or housings 60 and emit a downwardly directed airflow producing an upward motion of the vehicle 10. The pods 60 are preferably arranged so that they are somewhat downwardly divergent. Thus, when the ducted fans 40 are rotated by the linkage connecting the ducted fans with the combustion engine 22, the thrust produced by the ducted fans 40 is concentrated to maximize the lifting efficiency of the produced thrust. The arrangement of the ducted fans 40 results in the torque produced by the four primary ducted fans 40 cancelling each other so that the vehicle 10 does not experience torque as a whole, and therefore, no yawing or spinning motions. The thrust generated from each ducted fan 40 is controlled by the on-board logic computer 30 in response to input commands from a joystick 58 or other suitable flight control means controlled by a driver.

Steering for the vehicle in flight is accomplished by a retractable rudder 61 (FIGS. 1 and 2) mounted on the top side 12e adjacent to the rear end 12d of the vehicle 10. The rudder 61 is also controlled by the computer 30 in response to input commands from the driver by means of the joystick 58. When not in use, the rudder 61 retracts into the rear end 12d of the vehicle 10.

Figure 4:
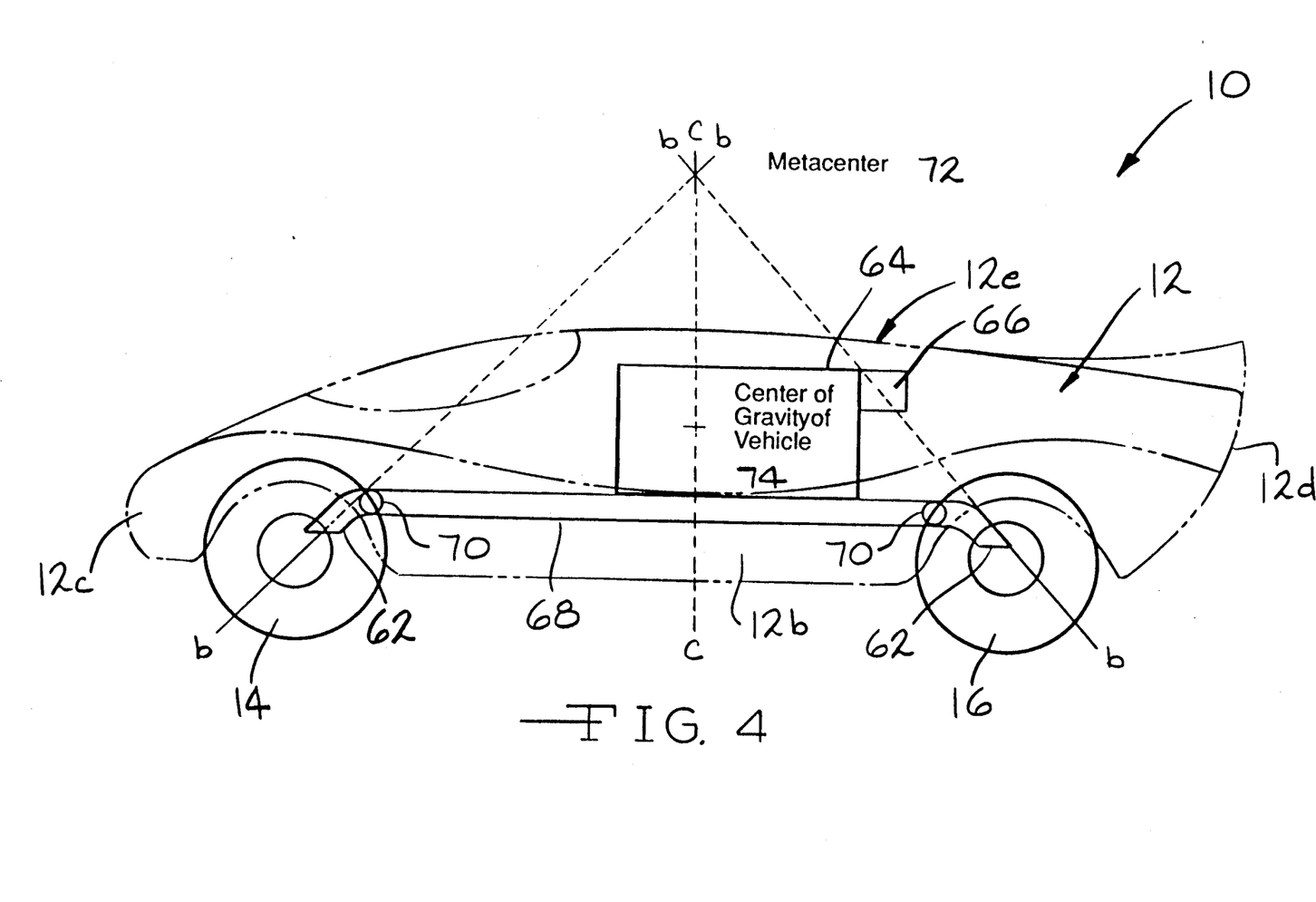
FIG. 4 is a side view of the vehicle 10 of FIG. 1 showing a compressed air plenum chamber 64 with compressor 66 ducted to pressure jets 62.
Figure 5:
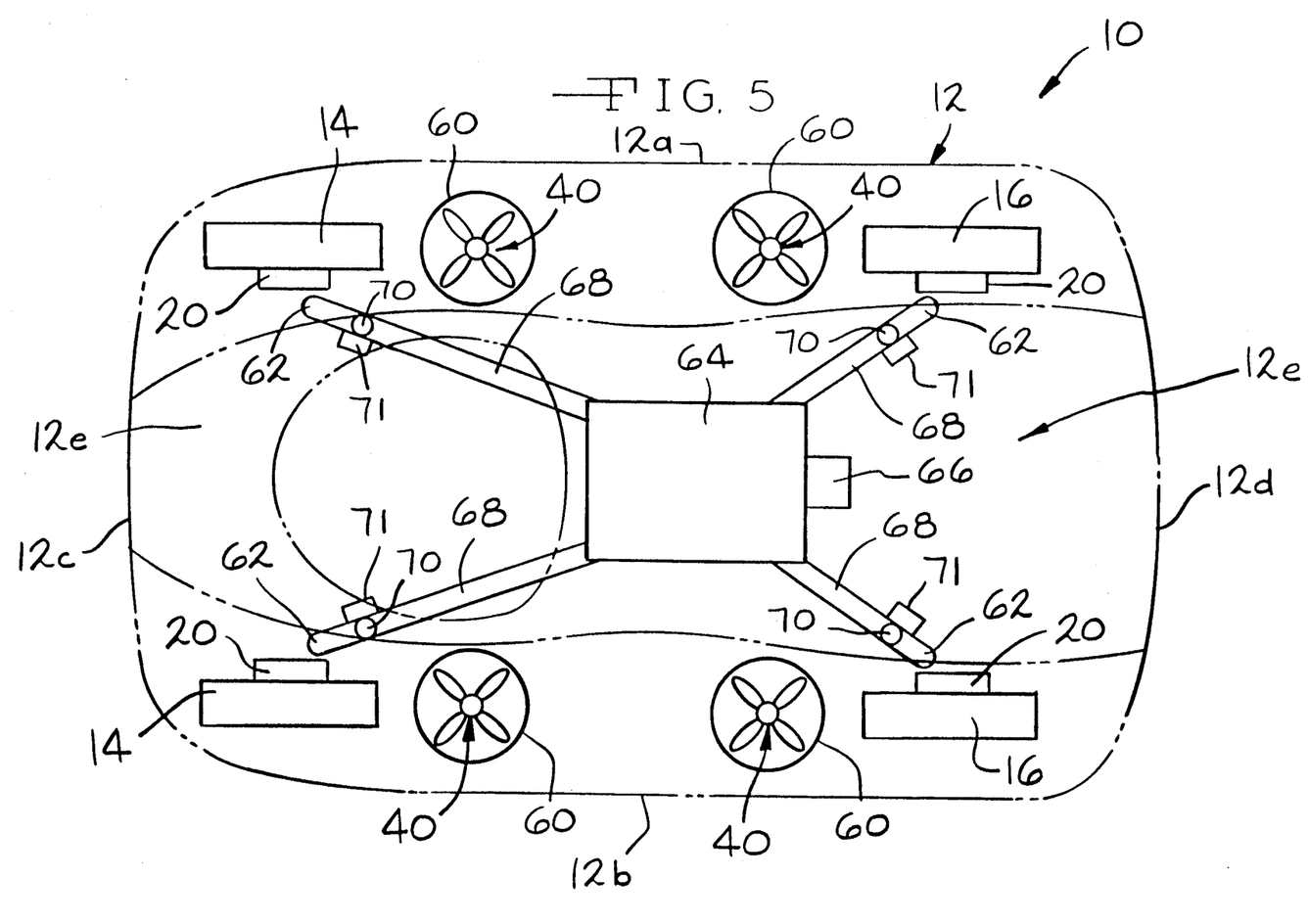
FIG. 5 is a plan view of the vehicle 10 of FIG. 1 showing pressure ducts 68 extending from the plenum chamber 64 to the pressure jets 62 and the ducted fans 40.

As shown in FIGS. 4 and 5, the lifting thrust produced by the four primary ducted fans 40 is augmented by four pressure jets 62 (only two jets 62 are shown in FIG. 4). The pressure jets 62 are mounted inside of and adjacent to the wheels 14 and 16 of the vehicle 10 and adjacent to the ducted fans 40. The pressure jets 62 also provide the vehicle 10 with fine steering control as well as additional lift to augment the lift produced by the ducted fans 40. The pressure jets 62 receive steering commands processed by the computer 30 in response to inputs from the joystick 58 for fine steering control of the vehicle 10 in flight.

The pressure jets 62 are supplied with compressed air from an on-board plenum chamber or storage tank 64, centrally located inside the vehicle 10. The plenum chamber 64 can be either permanently mounted on the vehicle 10 or it can be a portable unit that is removeable from the vehicle 10. In a preferred, permanently mounted embodiment, the vehicle 10 is constructed of hollow piping that serves as framework for the vehicle 10 and provides for the plenum chamber 64. This construction helps to reduce the weight of the vehicle 10. This is important for vehicles that travel through the air. The storage tank 64 can also be a portable unit that is initially charged with compressed air from an external source and then mounted on the vehicle 10 when air travel is anticipated.

In the permanently mounted embodiment, the plenum chamber 64 is preferably recharged with compressed air by an on-board centrifugal compressor 66 supplied with outside air from an air scoop (not shown) mounted on the vehicle 10. The compressed air travels from the plenum chamber 64 to the jets 62 through pressure ducts 68. The compressor 66 is mounted adjacent to the plenum chamber 64 and is driven by either the combustion engine 22, the battery pack 24 or the combustion engine 22 in concert with the battery pack 24. This provides the compressor 66 with a redundant drive system should either the combustion engine 22 or the battery pack 24 cease to function properly. It is preferred to use the combustion engine 22 to drive the compressor 66, although the battery pack 24 preferably drives the compressor 66 when the combustion engine 22 is powering the ducted fans 40.

The compressor 66 is controlled by the computer 30 in response to a pressure valve (not shown) mounted on the plenum chamber 64. When the pressure in the chamber 64 falls below a predetermined amount the computer 30 automatically signals to turn on the combustion engine 22 or the battery pack 24 to drive the compressor 66 to recharge the chamber 64. Also, the portable storage tank 64 can be recharged (in a similar manner as the permanently mounted plenum chamber 64) once the initial charge of compressed air falls below a predetermined pressure level.

As explained above, the pressure jets 62 are supplied with compressed air from the plenum chamber 64 through compressed air ducts 68. The ducts 68 are provided with in-line rotary valves 70 actuated by small electric motors 71. As shown in FIG. 6, the rotary valves 70 are controlled by the computer 30 in response to driver input from the joystick 58. That way, commands from the computer 30 are routed through the electric motors 71 which control the in-line valves 70 to regulate the amount of compressed air emitting from each jet 62 to provide fine steering control for the vehicle 10 during flight. As shown in partial view in FIG. 4, each jet 62 thus produces a jet stream around and along a longitudinal axis b—b of the jet stream in such a manner that the longitudinal axis b—b of the four downwardly directed jets 62 extend to a metacenter point 72 along the vertical axis c—c of the vehicle 10 and spaced above a center of gravity point 74 of the vehicle 10. This provides the vehicle 10 with stability as it travels through the air.

As shown in FIG. 1, a secondary ducted fan or propeller 76 is mounted at a rearward position, adjacent to the rear end 12d of the vehicle 10 and provides for forward thrust. The secondary ducted fan 76 is similar to the ducted fans 40 and is geared to the combustion engine 22 through a clutch 78 and drive shaft 80. The clutch 78 can be mechanical or it can be electrically engagable which is preferred to reduce weight of the vehicle 10. The direction of rotation of the secondary ducted fan 76 can also be reversed to provide a backwards acting thrust for moving the vehicle 10 in a backwards direction. The amount of thrust produced by the propeller 76 including the direction of rotation, is controlled by the computer 30 as shown in FIG. 6.

In the preferred embodiment of the vehicle 10, curved surface silicon solar cell arrays or photo-electric cells 82 are mounted to the top side 12e or roof of the vehicle 10. The photo-electric cells 82 are connected to the battery pack 24 through the main power bus 26 and help regenerate the stored energy that has been released from the batter pack 24 for driving the wheel motor 20 and the compressor 66. In this manner, the vehicle 10 also acts as a solar powered vehicle. To compensate for the loss of array efficiency imposed by the vehicle's 10 curved shape, the photo-electric cells 82 may be gallium arsenide solar cells used exclusively or in conjunction with the silicon solar cells. Besides energizing the battery pack 24, the photo-electric cells 82 can be connected directly to the wheel motor 20. The block diagram in FIG. 6 depicts the photo-electric cells 82 as a source charger 39 for charging the batter 24.

The vehicle 10 is also provided with a cooling system (not shown) that acts as a heat exchanger to remove heat from the logic control computer 30 and from the battery pack 24, as is known by those skilled in the art. This acts to increase the efficiency of these components. An air pump (not shown) is also provided to disperse battery gases generated when the battery pack 24 is recharged during the regenerative batter process by the photo-electric cells 82 and the combustion engine 22 driven generator 32.

It is intended that the foregoing description be only illustrative of the present invention and that the present invention be limited only by the hereinafter appended claims.

I claim:

1. A vehicle capable of ground travel and of travel through the air, which comprises:
   (a) a vehicle body with ground engaging wheels journaled on the vehicle body to support the vehicle body for ground travel;
   (b) a prime mover means mounted on the vehicle body and connected to the ground engaging wheels for powering the vehicle for ground travel;
   (c) propulsion means mounted on the vehicle body for moving the vehicle in a horizontal direction in the air;
   (d) ducted fan means powered by the prime mover means and mounted on the vehicle body with nozzle means mounted on the ducted fan means for directing an efflux from the ducted fan means to produce a substantially downwardly vertical momentum thrust of a magnitude capable of lifting the vehicle off the ground for travel through the air;
   (e) a plurality of pressure jet means directing a compressed gas in a substantially downwardly vertical direction, wherein there is at least one pressure jet means adjacent to each of the ground engaging wheels of the vehicle and wherein each of the pressure jet means is capable of producing a thrust that can be selectively actuated for aiding in controlling the direction of the travel of the vehicle through the air and wherein the thrust of each of the pressure jet means has an essentially circular cross-section along and around a longitudinal axis of the thrust and wherein the longitudinal axis of the thrust of each of the pressure jet means intersect at a point spaced above a center of gravity point of the vehicle so that the pressure jet means act to stabilize the vehicle when the vehicle is traveling through the air;
   (f) supply means for the compressed gas mounted on the vehicle and connected to the pressure jet means; and
   (g) control means for independently actuating each of the pressure jet means to provide steering control for the vehicle in the air.

2. The vehicle of claim 1 wherein the prime mover means includes an electric drive means for driving the wheels.

3. The vehicle of claim 2 wherein the electric drive means is supplied with electricity from a battery means mounted on the vehicle.

4. The vehicle of claim 3 wherein the battery means is a nickel-cadmium battery.

5. The vehicle of claim 2 wherein the electric drive means is supplied with electricity from a combustion engine means driving a generator means.

6. The vehicle of claim 2 wherein the vehicle has a roof means comprised of photo-electric cell means which provide power for the electric drive means.

7. The vehicle of claim 6 wherein the photo-electric cell means are gallium arsenide cells.

8. The vehicle of claim 6 wherein the photo-electric cell means are silicon cells.

9. The vehicle of claim 2 wherein the electric drive means are provided at each of the ground engaging wheels for effecting ground travel of the vehicle.

10. The vehicle of claim 1 wherein the prime mover means for the ducted fan means is a gasoline powered engine which powers a propeller as the propulsion means.

11. The vehicle of claim 1 wherein the prime mover for the ducted fan means is a turbine engine means which powers a propeller as the propulsion means.

12. The vehicle of claim 1 wherein a portion of the momentum energy present when the vehicle is traveling over the ground is stored in an energy storage means when the vehicle is caused to decelerate.

13. The vehicle of claim 12 wherein the energy storage means is a flywheel generator means.

14. The vehicle of claim 1 wherein the pressure jet means are supplied with a compressed gas from a compressor means as the supply means powered by the prime mover means.

15. The vehicle of claim 14 wherein the compressed gas for the pressure jet means is stored in a chamber means on the vehicle means as the supply means when the vehicle is traveling over the ground.

16. The vehicle of claim 15 wherein the chamber means comprises a portion of the vehicle body which is hollow to provide the chamber means.

17. The vehicle of claim 15 wherein the chamber means is removeable from the vehicle means for filling the chamber means with the compressed gas.

18. The vehicle of claim 1 wherein the actuation of the pressure jet means is provided by valve means, which are intermediate the supply means and each of the pressure jet means.

19. A vehicle capable of ground travel and of travel through the air, which comprises:
   (a) a vehicle body with ground engaging wheels journaled on the vehicle body to support the vehicle body for ground travel;
   (b) a prime mover means mounted on the vehicle body and connected to the ground engaging wheels for powering the vehicle for ground travel;
   (c) ducted fan means powered by the prime mover means and mounted on the vehicle body with nozzle means mounted on the ducted fan means for directing an efflux from the ducted fan means to produce a substantially downwardly vertical momentum thrust of a magnitude capable of lifting the vehicle off the ground;
   (d) propulsion means mounted on the vehicle body for moving the vehicle in a horizontal direction in the air;
   (e) a plurality of pressure jet means directing a compressed gas in a substantially downwardly vertical direction, wherein there is at least one pressure jet means adjacent to each of the ground engaging wheels of the vehicle and wherein a thrust emitted by each of the pressure jet means is capable of being selectively controlled to regulate the amount of thrust emitted from the jet means to provide for steering the vehicle through the air;
   (f) supply means for the compressed gas mounted on the vehicle and connected to the pressure jet means; and
   (g) control means for independently actuating each of the pressure jet means to provide the steering control for the vehicle in the air.

20. The vehicle of claim 19 wherein the thrust of each of the pressure jet means has an essentially circular cross-section along and around a longitudinal axis of the thrust and wherein the longitudinal axis of the thrust of each of the pressure jet means intersect at a point spaced above a center of gravity point of the vehicle, so that the pressure jet means act to stabilize the vehicle when travelling through the air.

21. The vehicle of claim 19 wherein the pressure jet means are supplied with a compressed gas from a compressor means as the supply means powered by the prime mover means.

22. The vehicle of claim 21 wherein the compressed gas for the pressure jet means is stored in a chamber means on the vehicle means as the supply means when the vehicle is traveling over the ground.

23. The vehicle of claim 22 wherein the chamber means comprises a portion of the vehicle body which is hollow to provide the chamber means.

24. The vehicle of claim 22 wherein the chamber means is removeable from the vehicle means for filling the chamber means with the compressed gas.

25. The vehicle of claim 19 wherein the actuation of the pressure jet means is provided by valve means which are intermediate the supply means and each of the pressure jet means.

* * * * *